March 30, 1965 H. MOLLY 3,175,363
HYDRAULIC MACHINE OF AXIAL PISTON TYPE
Filed April 17, 1962 8 Sheets-Sheet 1
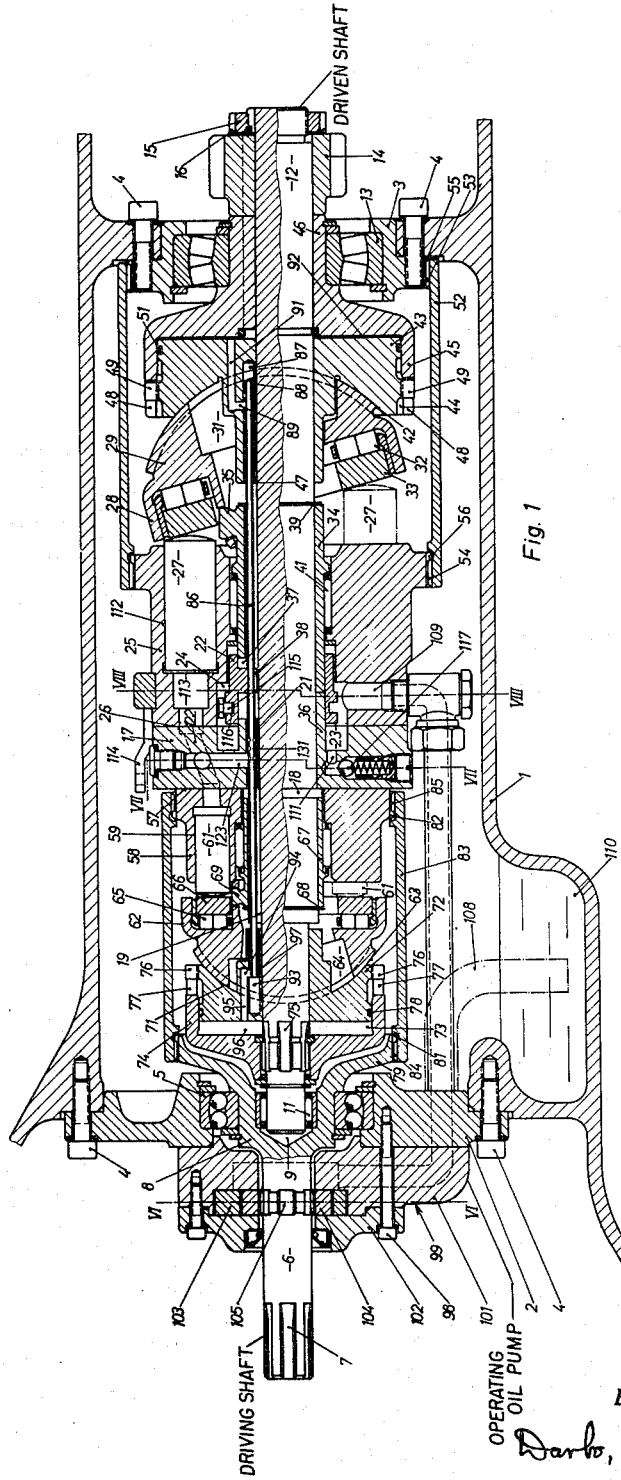
INVENTOR:
Hans Molly
BY
Darbo, Robertson & Vandenburgh.
Attys.

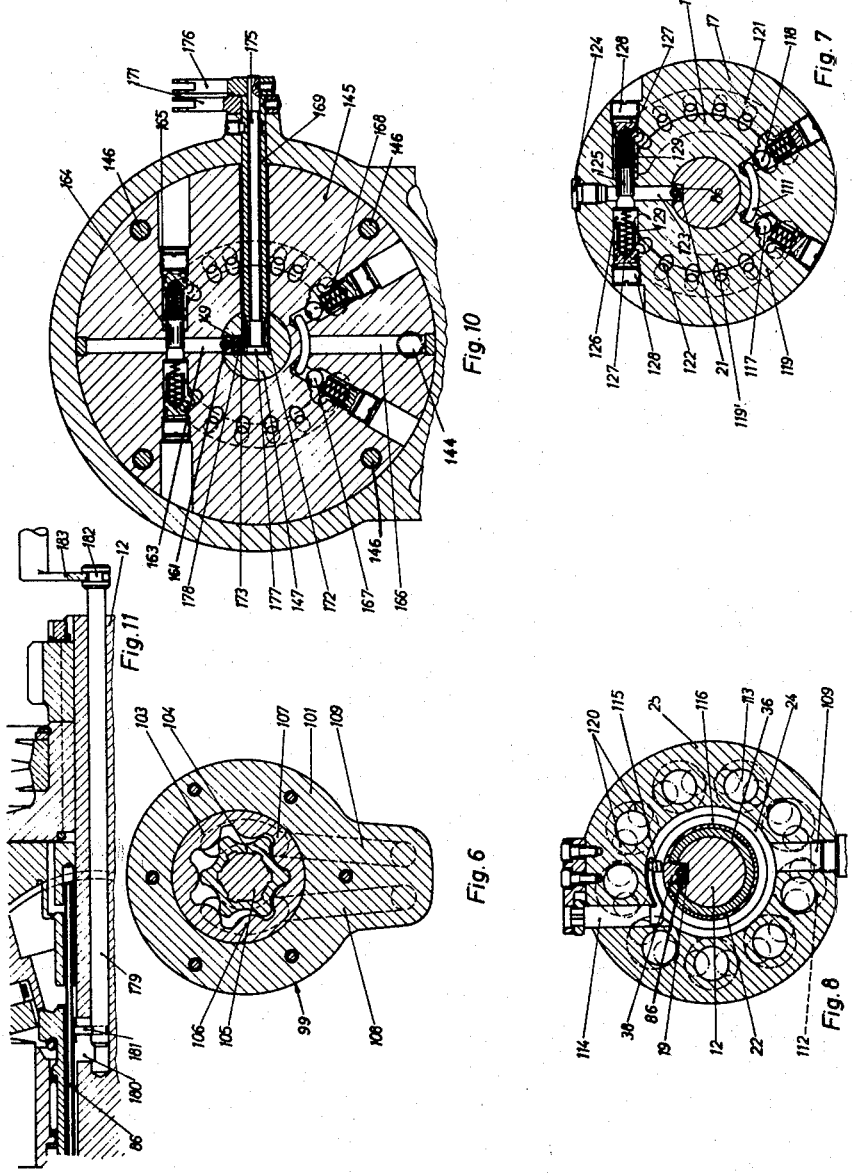

INVENTOR:
Hans Molly
BY
Darby, Robertson & Vandenburgh
attys.

INVENTOR:
Hans Molly
BY
Darbo, Robertson & Vandenburgh,
Attys.

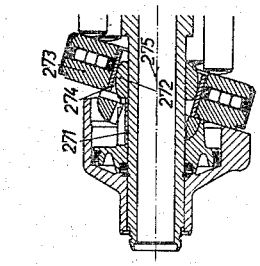
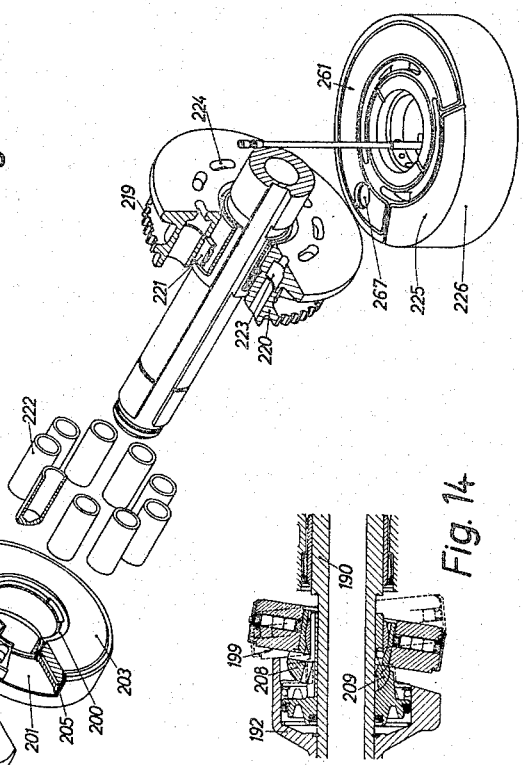
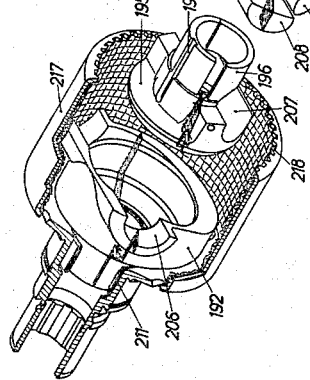
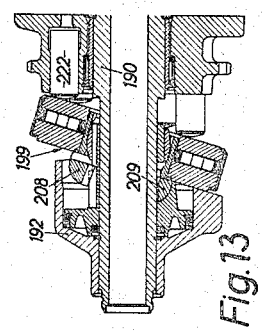

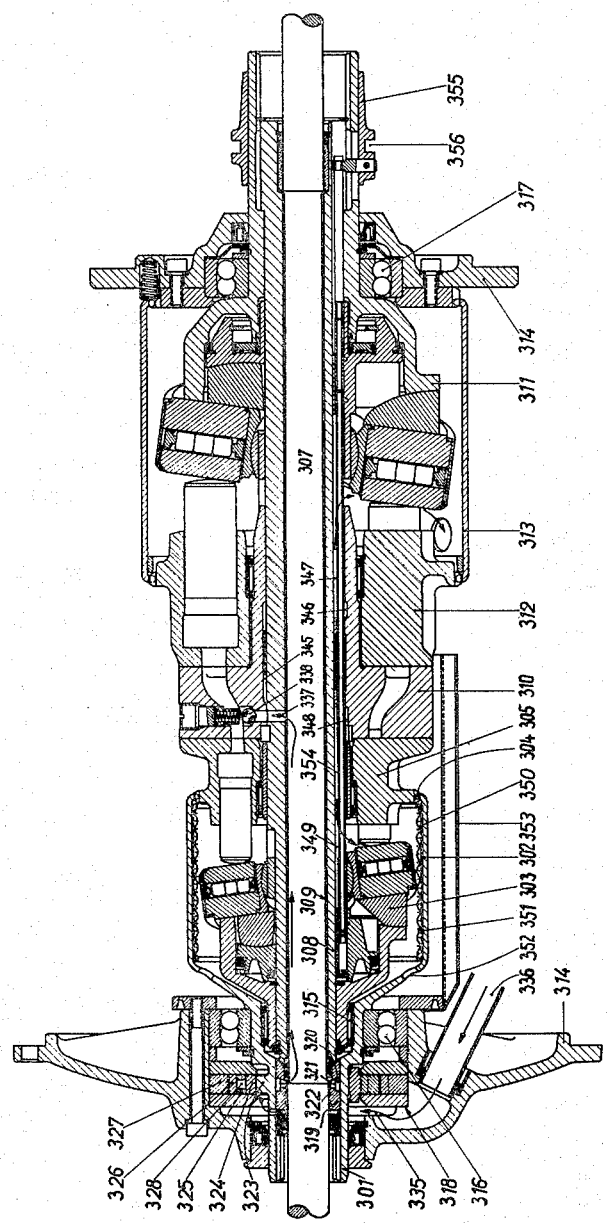

March 30, 1965 H. MOLLY 3,175,363
HYDRAULIC MACHINE OF AXIAL PISTON TYPE
Filed April 17, 1962 8 Sheets-Sheet 8

INVENTOR:
Hans Molly
BY
Darby, Roberton & Vanderburgh,
Attys.

3,175,363
HYDRAULIC MACHINE OF AXIAL PISTON TYPE
Hans Molly, 48 Dr. Eugen-Essig-Strasse, Malsch,
 Kreis Karlsruhe, Germany
Filed Apr. 17, 1962, Ser. No. 189,240
Claims priority, application Germany, Apr. 20, 1961,
 M 48,764; Feb. 16, 1962, M 51,839; Feb. 16, 1962,
 M 51,840
31 Claims. (Cl. 60—53)

The invention relates to hydraulic axial piston machines. As is well known, axial piston type machines have a cylinder block with axial cylinder bores in which pistons may slide, the pistons abutting an oblique disk inclined relatively to the axis of the cylinder block. With a relative rotary movement between the oblique disk and the cylinder block, the pistons execute a stroke. Now, the cylinders may be alternatingly connected with a suction and a pressure pipe over valves or a controlling slide valve in such a manner that the arrangement acts as a pump. On the other hand, oil under pressure may be fed to the cylinders, which oil acts on the pistons in such a manner that a relative rotary movement between the oblique disk and the cylinder block is produced and the machine operates as hydraulic motor. It is known to adjust the position of the oblique disk relatively to the cylinder block in order to thereby change the piston displacement and therewith the capacity of the pump or the motor speed, as the case may be.

It is known to combine a pump of this type with a correspondingly designed hydraulic motor. If the pump is being driven with an input speed $n_1$, an output speed $n_2$ is derived from the motor being supplied by the pump. The ratio $$i = \frac{n_1}{n_2}$$

may be changed through adjustment of the oblique disks. Such an arrangement is provided by a hydrostatic axial piston transmission with constantly varying transmission ratio. Such types of transmissions are applicable to many fields of technics, as, by way of example, for machine tool drives or for automobile or tractor drives. Such devices—pumps, oil motors, transmissions—are considered herein under the collective name "hydraulic axial piston machines."

Hydrostatic aixal piston transmissions are known where the oblique disks are fixedly arranged and one of the cylinder blocks is connected with the driving shaft and the other with the driven shaft. With such transmissions the total power is hydraulically transmitted. Since the efficiency of the hydraulic power transmission ratio is relatively low and with known transmissions has a maximum of about 80% and, furthermore, from a maximum value the efficiency strongly decreases again as the transmission ratio $i$ moves towards 1, such transmissions are disadvantageous for many purposes. However, transmissions with "power branching" are also known, where, by way of example, a cylinder block is driven by the driving shaft, the second cylinder block is stationary with repect to the casing and the associated oblique disks are rotating together with the driven shaft. Such transmissions have the property to the effect that a portion of the power is entirely mechanically transmitted with essentially 100% efficiency. This portion of the purely mechanically transmitted power is zero for $i=0$ and becomes 100% for $i=1$. A more favorable efficiency behavior of the transmission results since only a portion of the power is transmitted with the poorer hydraulic efficiency. In particular, the drop of the efficiency as $i$ approches 1 is avoided.

It is known to adjust the oblique disks of such axial piston machines by means of hydraulic auxiliary forces. With known arrangements of this type, the oblique disks are rotatably supported about an axis which is perpendicular to and intersects the rotational axis of the machine.

The known axial piston type machines are relatively complicated in design. In particular, great difficulties arise in adjusting the oblique disks. With a known axial piston transmission with power branching (German Patent No. 1,052,766) the oblique disks are mechanically coupled with each other and a simultaneous adjustment in opposite direction of the two oblique disks takes place with a complicated mechanism. This does not only lead to constructional difficulties, increased cost and increased susceptibility to failure, but also results in an unfavorable transmission ratio versus path of adjustment characteristic. Other transmissions with power branching adjust the rotating oblique disks with cam means in an also rotating axially movable control bell. This construction, too, is most complicated.

It is a primary object of the present invention to provide simplified means of the adjustment of the oblique disks in hydraulic axial piston machines, especially in hydrostatic axial piston transmission.

The invention is based on the realization that a substantial difficulty of the known constructions lies in the fact that double acting adjusting gear is required for adjusting the oblique disks, that is to say, a gear which acts to provide a to-and-fro adjustment of the oblique disks. With the customary symmetrical positioning of the oblique disk relatively to the associated pistons, the pistons do not exert any resetting forces on the oblique disk with an adjustment of the same. This is due to the fact that the separating line between pressure chamber (tending to move the pistons into the cylinder block) and suction chamber (tending to move the pistons out of the cylinder block) extends perpendicularly to the axis of rotation of the system so that the oblique disk is always equally loaded with pressure exerted by the pistons on both sides of the axis of inclination of the disk, on each side partly with pistons connected to the pressure side and partly with pistons connected to the suction side. Thus, the pistons do not exert a resulting inclinational torque on the oblique disk which might become effective as resetting force with reference to an adjusting movement of the disk.

According to the invention, provision is made that with a rotation of the oblique disk a common axial displacement of the axial pistons takes place and that a single-acting auxiliary hydraulic force becomes axially effective against the resetting force of the axial pistons. Through a common axial displacement superimposed on the inclinational movement of the disk a resetting force is produced counteracting the inclinational and axial movement so that a single-acting auxiliary hydraulic force will be sufficient. With a decrease of the auxiliary force the oblique disk automatically moves responsive to the influence of the resetting force exerted by the pistons. The design is substantially simplified.

Various adjusting transmissions are possible where an axial displacement is superimposed upon an inclinational movement of the oblique disk. The arrangement, however, becomes particularly simple if the oblique disk is pivotally supported at an off-center axially fixed point and inclinable thereabout through auxiliary hydraulic force.

It is expedient to provide a follow piston arrangement for the adjustment where an axially movable control sleeve on the one hand provides a follow piston system as pick-up piston with a hydraulic adjusting piston and at the same time carries pressure means for the adjusting cylinder. This results in a very simple adjusting device. Such a device could also be applicable for other simple-acting hydraulic adjusting gears other than in axial piston machines.

It is a further object of this invention to simplify and improve the design of hydrostatic axial piston transmissions relatively to known constructions. The invention provides for a basic design of a transmission with two coaxially arranged axial piston and oblique disk systems one of which acts as pump and the other as motor, where, in accordance with the invention, one adjusting cylinder body, one adjusting piston, one oblique disk and one cylinder block each are slipped over and mounted upon a central shaft on both sides of a double-acting operating slide valve. Such a transmission may be designed as power-branched transmission in that one cylinder block is driven while the other is stationarily arranged with respect to the casing, and the central shaft with which the oblique disks rotate provides the driven shaft. It may, however, also be a transmission with purely hydraulic power transmission where one cylinder block is connected with a driving shaft and the other cylinder block is connected with the driven shaft through fork-shaped or bell-shaped driving members gripping around the adjusting cylinder bodies and with the oblique disks outside, while the adjusting cylinder bodies and oblique disks are supported on a stationary central shaft and the operating slide valve is supported stationary with respect to the casing. In both cases a simple and clear design results.

With a transmission of the type herein described, an adjustment possibility particularly simple with the described follow piston arrangement can be provided for the oblique disks by arranging the control sleeve for guidance in a groove of the central shaft. It thereby becomes possible for one control sleeve to control two single-acting adjusting pistons for the adjustment of the two oblique disks of an axial piston system with one part acting as pump and one part acting as motor, a dead stroke of the control sleeve being provided so that one adjusting piston executes its full stroke, before the other adjusting piston starts its stroke.

A further most advantageous design for adjusting the oblique disks is obtained, if, as hereinafter described with reference to an alternative embodiment of the invention the oblique disk is inclinationally and axially movably arranged on a central guide member and supported on two supporting members parallel to each other and transversely relatively to the guide member, one of which is supported in an adjusting cylinder for the auxiliary hydraulic force and the other in an adjusting piston sliding therein. It is expedient to have the supporting members designed as rotatably supported half-cylindrical bolts on the plane surface of which the oblique disk is supported. The guide member may be provided by a central shaft.

A static balancing of the oblique disk may be provided. It is expedient to this end to have the oblique disk annularly surrounding the guide member supported with a spherical inner surface on a toroidal ring with correspondingly spherical surface, being axially movably guided on the guide member. The oblique disk may thereby be inclinationally supported about its center of gravity on the rotational axis. Besides, this latter case offers the advantage that the load of the oblique disk exerted by the pistons is distributed on a relatively wide annular area of the oblique disk over a period of time. The contact surface of the oblique disk may be supported over thrust bearings with several rollers adjacent each other and thereby a smaller medium bearing load and a longer life is obtained.

In order to render possible the mounting of the oblique disk on the spherical toroidal ring, the oblique disk may have axial grooves opposite each other at the inside, having the width of the toroidal ring. Then, the toroidal ring is moved in the grooves into the central opening of the oblique disk body, until the centers of the toroidal ring surface and of the spherical inner surface of the oblique disk body coincide. At this point, however, the toroidal ring may be rotated as desired relatively to the oblique disk body and the grooves, since then one spherical surface slides in the other. Then, the toroidal ring together with the oblique disk secured thereupon may be drawn onto the central guide member.

Another still simpler constructional solution consists in that the annular oblique disk is supported with a cylindrical inner surface on a spherical torus. This type of support, too, permits an inclinational movement of the oblique disk relatively to the axis and an axial movement of the oblique disk with the cylindrical inner surface relatively to the spherical torus. This has the advantage of greater simplicity. A shortcoming, however, is that the center of gravity of the oblique disk is not always exactly positioned on the axis so that a certain static unbalance may be manifested. It can, however, be shown that such resulting shortcoming is so insignificant as to be negligible.

With this arrangement, too, a dynamic unbalance is occurring. Therefore, with inclined oblique disk a torque caused by the centrifugal forces is acting on the oblique disk, which tries to adjust the oblique disk to be perpendicularly arranged relatively to the rotational axis. Normally, this torque is counteracted by forces exerted by the pistons and the adjusting piston. It may, however, occur that the working pressure suddenly drops. By way of example, this may occur if a hydrostatic axial piston transmission designed in accordance with the invention initially has to transmit a great torque with a high reduction ratio and this torque suddenly disappears or is greatly reduced, without the reduction ratio changing immediately. This case occurs, for example, if a tractor with such a transmission slowly moves up a hill (high reduction ratio, great torque) and at the top the torque to be transmitted suddenly decreases. Then, the working pressure in the transmission breaks down until the transmission ratio is possibly correspondingly changed through adjustment of the transmission, the tractor moves faster and a higher torque again occurs. Similar conditions may also arise with other applications, for example also if the gas supply is throttled with full driving speed.

Now, it is customary to feed operating oil for make-up and control purposes under a selected pressure to the system by means of an operating oil pump and pressure regulating means. This operating oil pressure is present as well on the suction side of the axial piston-type machine as also, at least, on the pressure side. The operating oil pressure does not exert a torque, since it exists both on the suction side and on the pressure side of the axial piston machine. The transmitted torque determines the differential of working pressure and operating oil pressure. Therefore, with minor torque the working pressure is only relatively little above the operating oil pressure. The force exerted by the operating oil pressure on the axial piston is normally not in a position, now to overcome the torque exercised by the centrifugal forces on the oblique disk. The oblique disk can therefore straighten out so that the non-positive connection with the supporting members gets lost. The cylinder block, too, is non-positively pressed against the controlling slide valve by the working pressure, the force of contact pressure supporting at the oblique disk over the axial pistons.

In order to avoid these undesirable phenomena, the invention furthermore provides, that reversing means impinged upon by the working oil pressure of the machine are provided which respond with a decrease of the working oil pressure below a minimum value and whereby a higher theoretical value of the pressure regulating means is adjustable. If then, the torque decreases and also the working pressure is correspondingly reduced, an automatic reversal to a higher operating pump pressure results. The working pressure is thereby correspondingly increased, since the transmitted torque is determined by the differential of working oil pressure and operating pump pressure. This increased pressure, then, is in a position again to overcome the tilting torque caused by the centrifugal forces.

Centrifugal forces act on the piston similar to the forces that act on the inclined oblique disk. Since with inclined oblique disk the pistons on one side protrude further from their cylinders than on the opposite side, torques are occurring which try to tilt the cylinder block. The centrifugal forces that act on each individual piston, are rotating with the cylinder block speed. However, the to-and-fro movement of the pistons takes place according to the inclination of the oblique disk and with the speed of same, also the torque applied to the cylinder block is a rotating force. The points of contact of the centrifugal forces are moved in axial direction in accordance with the inclination of the oblique disk.

The support of the cylinder block is normally not adapted to receive this torque, since the cylinder block must flatly and tightly abut the operating slide valve surface and must therefore be able to align relatively thereto. The very highly adjusted axial relief of the operating slide valve surface does not stand an additional tilting stress.

In a further modification of the invention, the diameter of the operating slide valve surface is increased by the torque, which is exerted on the cylinder block by the centrifugal forces of the pistons, relatively to the diameter required for the function of the operating slide valve alone, and a pressure field arranged on the enlarged operating slide valve surface, which is impinged upon by a pressure proportional to the working pressure and with the residual force of the axial relief constitutes a momentum which is counteracting to the centrifugal force momentum of the pistons. Therein the fact is utilized that the operating slide valve always rotates with the oblique disks or is stationarily arranged depending on what type of transmission is involved and that therefore the pressure field on the operating slide valve surface is synchronously rotating with the centrifugal force momentum and can compensate the same.

As a rule with transmissions of the type herein described, an operating oil pump is provided which maintains a certain minimum oil pressure also on the suction side in the hydraulic system and balances oil leakage losses. A particularly advantageous oil conduction is provided if the operating oil pump annularly surrounds the shaft and feeds operating oil under pressure inwardly into an operating oil channel extending along the shaft. From this channel the oil may then be tapped at any desired point and fed into the operating slide valve. Thereby, it is insignificant whether the operating slide valve is rotating with the shaft or whether these two parts are stationarily arranged. Operating oil pipes extending at the outside are omitted. The arrangement may be one in which the shaft consists of a central part and a sleeve encloses the same a spaced distance apart therefrom and between these members an annular operating oil channel is provided. With such a symmetrical arrangement the oil may be supplied or discharged in any desired direction.

With a transmission wherein in the known manner the operating oil system is in connection with the outlet over an elastically suspended pressure control valve, provision can be made that the operating oil flowing through the pressure control valve flows off in axial channels along the shaft to both sides below the cylinder block and under the influence of centrifugal force is sprayed against the oblique disks and cools the same. It is expedient to have at least one of the oblique disks surrounded by a cylinder the inner surface of which is coated with a strongly absorbent material. Thereby, a thorough, continuous purification of the oil from undesirable dirt particles is effected whereby the life of the transmission can be substantially increased. Pilot-cloth of the kind of "Molton"- cloth proves to be advantageous as absorbent material. The absorbent material may be exchanged from time to time.

Illustrative embodiments of the invention are presented in the drawings and described as follows:

FIG. 1 is a longitudinal section through a power-branched hydrostatic axial piston transmission according to the invention;

FIGS. 2 to 5 diagrammatically show different positions of the oblique disks for attaining different transmission ratios;

FIG. 6 is a cross-sectional view taken along line VI—VI of FIG. 1 and shows the operating oil pump of the transmission;

FIG. 7 is a cross-sectional view through the operating slide valve taken along line VII—VII of FIG. 1;

FIG. 8 is a cross-sectional view through the stationary cylinder block of the transmission taken along line VIII—VIII of FIG. 1;

FIG. 10 is a cross-sectional view taken along line X—X of FIG. 9;

FIG. 11 is a detail view, in cross section, showing another embodiment of adjusting mechanism;

FIGS. 13 and 14 are detail views, in cross section, showing the oblique disk of the transmission of FIG. 12 with its adjusting gear and the cylinder block for different positions of the oblique disk;

FIG. 15 is an exploded view of the transmission of FIG. 12 illustrating the parts thereof in perspective and partly in section;

FIG. 18 is a detail view, in cross section, showing somewhat modified arrangement of the corresponding parts of FIG. 12;

FIG. 19 is a longitudinal section through an axial piston transmission embodying a further modification of the invention;

Figure 9:
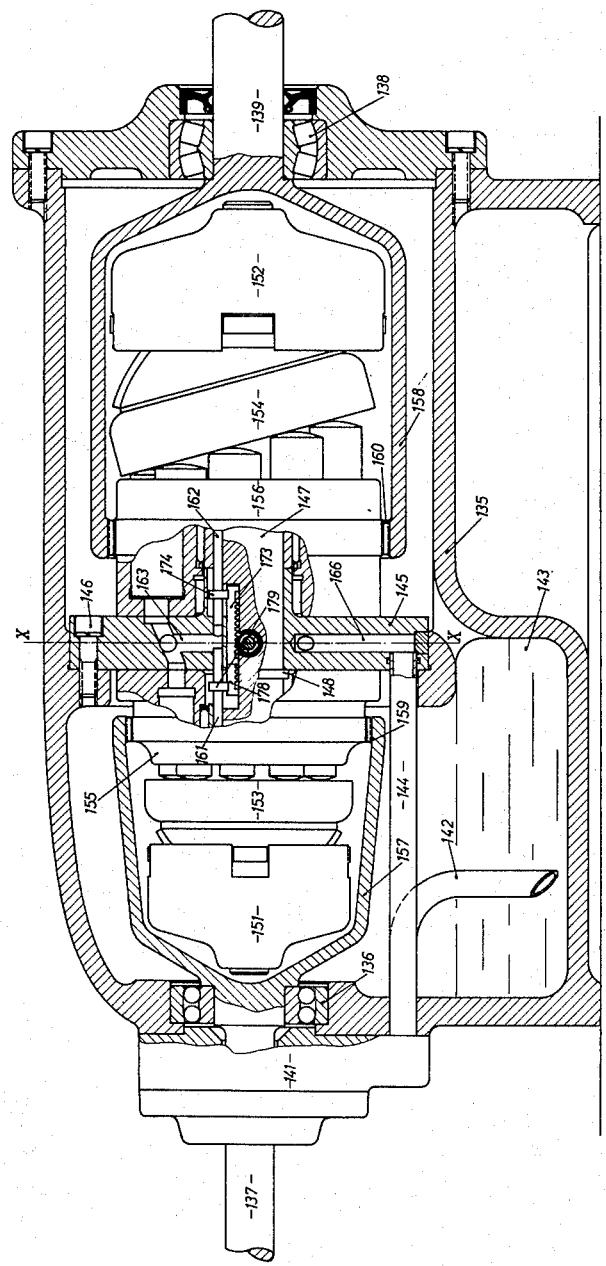
FIG. 9 is a longitudinal view, partly in section, of a hydrostatic axial piston transmission without power branching.

Reference is first made to FIGS. 1 to 8 wherein a transmission with power branching is shown, that is, a transmission where a portion of the transmitted power is directly mechanically transmitted and only a portion of the power is transmitted as hydraulic power. Reference numeral 1 designates a generally cylindrical casing body which is closed at its two front ends by bearing plates 2, 3 screwed to the casing body 1 by screws 4. In the bearing plate 2 a driving shaft 6 is supported in a ball bearing 5. The driving shaft 6 has splines 7 for coupling a driving machine not shown, for instance a diesel engine. At its inner end the driving shaft 6 has an enlarged portion 8 with a central dead-end bore 9. In this bore one end of the driven shaft 12 is supported by means of a roller bearing 11. The driven shaft 12 extends through the whole transmission and is supported in the bearing plate 3 by means of a roller bearing 13. A gear 14 is keyed with the protruding end of the shaft 12 for connection with the load and is secured by a nut 15 and a spring washer 16.

An operating slide valve 17 is slipped over and onto the shaft 12 from the right and abuts a shoulder 18 of the shaft. The shaft 12 has a long longitudinal groove 19 (see also FIG. 8). A spline 21 of the operating slide valve 17 is engaged in said groove 19 so that the slide valve is non-rotatably keyed with the shaft 12. Reference numeral 22 designates an adjusting sleeve which is axially movable in central recesses 23 and 24 of the operating slide valve 17 and of a cylinder block 25, as will be described hereinafter. The cylinder block 25 sealingly abuts the right face 26 of the operating slide valve 17.

The cylinder block 25 has axial bores in which pistons 27 reciprocate. The pistons 27 abut an oblique disk or swash plate assembly generally 28 or, more accurately, a race 33 forming a part of and journalled in disk 28. The oblique disk 28 comprises a base body 29 of semi-cylindrical basic shape with a cylindrical guide surface and a central opening 31 across which the shaft 12 extends. The opening 31 is wide enough to permit a range of inclination of the body 29 relatively to the shaft 12. The race 33, engaged by the pistons, is supported on the base body 29 by means of a thrust bearing 32.

A sleeve 34 surrounds and is secured to driven shaft 12. This sleeve has a radially projecting shoulder 35 which serves as a pivot about which the oblique disk or swash plate assembly may move in inclination. The base body 29 of the swash plate assembly is eccentrically supported by this shoulder without the two having a relative rotational movement about the axis of driven shaft 12. Sleeve 34 tightly engages shaft 12 and with its one end abuts an axial collar 36 of the operating slide valve 17. A sleeve 22 is arranged to slide axially on the collar 36 and the end of sleeve 34. At groove 19 the collar 36 and the end of sleeve 34 have a longitudinal slot 37 through which a projecting single spline 38 of the adjusting sleeve 22 extends into the groove 19, as can be seen in FIG. 8. At the other end of sleeve 34 is a spring ring 39 engaged in a groove in the driven shaft to prevent the sleeve from moving axially to the right in FIGURE 1. Therefore, sleeve 34 is rigidly connected with shaft 12 just as is the operating slide valve 17. The cylinder block 25 is supported for relative rotation on sleeve 34 by means of a needle bearing 41.

The base body 29 of the oblique disk or swash plate assembly is supported with its cylinder surface in a corresponding cylindrical guide surface 42 of an adjusting piston 43. The adjusting piston 43 is non-rotatably guided in an adjusting cylinder 44 being provided in a cup-shaped adjusting cylinder body 45. The adjusting cylinder body 45 has a collar 46 which is keyed to driven shaft 12 by means of groove 19. Through this collar 46 the shaft 12 is supported in the bearing 13. Piston 43 has a spline 47 which protrudes into the groove 19 for reasons which will be specified hereinafter. For the transmission of torque it is connected at its periphery with the cylinder body 45 which has axial slots 48 into which radial projecting parts 49 of the piston 43 protrude. For sealing the piston 43 in the cylinder 44 an O-ring 51 is provided.

The cylinder block 25 is held non-rotatably in the casing 1. This is achieved by means of a hollow cylinder 52 which surrounds oblique disk 28 and the adjusting cylinder body 43. Cylinder 52 has two internal toothings 53, 54 at its two ends. These internal toothings 53, 54 are in clearance engagement with two toothings 55 and 56, respectively, of the fixed bearing plate 3 and of the cylinder block 25, respectively. Thus, the cylinder block is held against rotation. The clearance, however, ensures that the cylinder block can satisfactorily align relatively to the face 26 of operating slide valve 17.

At the pump end of the transmission, (the left end in FIGURE 1), a cylinder block 58 abuts face 57 of operating slide valve 17. The cylinder block 58, just as the cylinder block 25, has axial cylinder bores 59 in which pistons 61 reciprocate. Pistons 61 engage an oblique disk structure or adjustable swash plate assembly which is generally designated with reference numeral 62. Similarly to the oblique disk 28, the oblique disk 62 comprises a semi-cylindrical base body 63 with an opening 64 for passage of shaft 12. Opening 64 is widened so as to permit inclinational movement of body 63. A race 66, which pistons 61 abut, is movably supported in the base body 63 by means of a thrust bearing 65.

A sleeve 67 is mounted on shaft 12, being axially secured by a spring ring 68. Similarly to sleeve 34, said sleeve 67 has a radially projecting shoulder 69 which is engaged as a pivot by the oblique disk base body 63 as an eccentric stop about which the disk may be moved in inclination. The oblique disk base body 63 is supported with its cylinder surface in a corresponding cylindrical bearing surface 71 of an adjusting piston 72. The adjusting piston 72 is guided in a cylinder 73, of a cylinder body 74. The cylinder body 74 is keyed with driven shaft 12 at 75. Piston 72 is provided with radially projecting parts 76 which are guided in longitudinal slots 77 of the cylinder body 74. The sealing of the adjusting piston 72 in the cylinder 73 also is effected by an O-ring 78 inserted in an annular groove of piston 72.

The enlargement 8 of the driving shaft 6 flares out into a bell-shaped radial flange 79 having an external peripheral toothing 81. The cylinder block 58 has an external toothing 82. A hollow cylinder 83 which encloses the cylinder block 58, the oblique disk 62 and the adjusting cylinder body 74 is provided with internal toothings 84, 85 at its two ends, which are in clearance engagement with the toothings 81, 82 respectively. Consequently, the cylinder block 58 is driven by the driving shaft 6. Here, too, the clearance in the toothings makes possible an exact engagement of the cylinder block 58 with the face 57 of operating slide valve 17.

Thus, with the design as described the cylinder block 58 rotates with the driving shaft. The cylinder block 25 is stationary with respect to the casing. The oblique disks 28 and 62 with the associated adjusting cylinders and pistons 43, 45 and 72, 74 respectively, and the sleeves 34 and 67 as well as the operating slide valve 17 rotate with driven shaft 12.

A tubular control slide 86 is arranged in groove 19 and is fixedly mounted in the projecting spline 38 of sleeve 22. Piston 43 has an axial bore 87 in a portion of spline 47 thereof which extends into groove 19, into which bore an open end of the control slide 86 protrudes. The end of the control slide has an enlargement 88 which sealingly slides in bore 87 as a hollow piston. A channel 91 and lateral opening 89 provides connection of the bore 87 with the adjusting cylinder chamber 92. In a similar manner, piston 72 sliding on a reduced diameter of shaft 12, has an axial bore 93 in a portion thereof which extends into groove 19 and is connected by means of a lateral opening 94 and a channel 95 with the adjusting cylinder chamber 96. Into this bore 93 the other, also open and enlarged end 97 of sleeve 86 protrudes, being sealingly guided in bore 93 in a hollow piston.

The casing of an operating oil pump, which is generally designated by reference numeral 99, is screwed to the bearing plate 2 by means of screws 98. This casing comprises two casing parts 101 and 102 which are held together by the screws 98. As is well known, the operating oil pump serves the purpose of feeding oil under pressure to the hydraulic system of the transmission so that the transmission can operate. With the transmission according to the invention, the operating oil pump need not develop particularly high pressures and any desired type of pump may be used. With the described illustrative embodiment, a known type of cycloidal pump is provided as operating oil pump 99, as can be seen in FIG. 6. Therein, an outer pump body 103 provided with a kind of rounded internal toothing, (FIGS. 1 and 6) is supported in the casing part 101, in which an inner pump body 104 with a similarly rounded external toothing rolls. The inner pump body 104 is keyed with shaft 6 at 105. With the turning of body 104, oil is supplied in known manner from a suction chamber 106 (FIG. 6) of the casing part 101 to the pressure chamber 107. With the design, body 103 in the casing part 101 rotates with 6/7 of the speed of driving shaft 6 (7 teeth outside, 6 teeth inside).

The suction chamber 106 is connected with a sump 110 through a channel 108 (FIGS. 1 and 6). The pressure chamber 107 is connected through a channel and pipe 109 with an annular chamber 24 around the shaft 12 in the stationary cylinder block 25 (FIGS. 1, 6 and 8).

The cylinder block 25 has axial regularly spaced cylinder bores 112, in which the postons 27 reciprocate. Inside connection bores 113 connected with these cylinder bores, have a smaller diameter and open through double holes 120 to face 26 of operating slide valve 17. As can be seen in FIG. 8, the lowermost connecting bores 113 of two adjacent cylinder bores 112 are offset in opposite directions to provide a space through which the operating oil channel 109 passes. In a similar manner, two connection bores 113 are eccentrically offset in opposite directions relative to their cylinder bores 112 so that between them a space is provided for the passage of an adjusting crank 114 which engages into an annular groove 116 of sleeve 22 with a pin 115. Through rotation of crank 114 sleeve 22 and consequently the tubular control slide 86 can be axially displaced relative to shaft 12 during operation of the transmission.

The annular chamber 24 is in connection with an annular chamber 23 of the operating slide valve 17. Chamber 23 is connected with the arc-shaped control chambers 119, 121, 119', 121', (FIG. 7) of the operating slide valve 17 through a slot 111 and through two check valves 117, 118. Thus, operating oil always flows into the control chambers acting as suction chambers if the oil pressure therein drops below the operating oil pressure. Opposite control chambers 119 and 119' or 121 and 121', respectively, of the operating slide valve 17 are connected with each other through channels 122 (FIGS. 1 and 7). In the illustrated embodiment, these channels extend obliquely since the control chambers 119, 121 of the operating slide valve have a larger diameter than the chambers 119', 121'. The operating slide valve 17 has a radial bore 123 in the space between the arc-shaped control chambers 119, 121 opposite each other, which bore is closed by a plug 124 (or a safety valve). The inner end of bore 123 is open at the groove 19. Through a slide valve 125 and a transverse bore 126 bore 123 is always connected with that control chamber 119, or 121 depending upon which is under the higher pressure. With the transmission in question, this may be depending on the position of the oblique disk 62 (FIG. 7) either the left or the right chamber 119 or 121 of the controlling slide valve 17. Slide valve 125 is resiliently suspended on both sides by springs 127 which are supported at plugs 128 which are screwed into bore 126 and close the latter. Collars 129 of the plugs 128 on the one hand serve as guide for the springs 127 and at the same time as stops for slide piston 125.

The tubular control slide 86 is sealingly guided in the hole 21 of the operating slide valve 17 and has holes 131 (FIG. 1) in its walls within the range of bore 123.

The described arrangement operates as follows:

Through the adjusting crank 114 and sleeve 22, the tubular control slide 86 may be axially displaced in groove 19. In the left extreme position of the slide, the end 97 is located in the dead zone of bore 93 beyond the control opening 94. At this setting, oil may flow from the adjusting cylinder chamber 96 through channel 95, opening 94, bore 93 about the outside of slide 86 and then into the sump 110. The oil in the cylinder chamber 96 is under pressure due to the force exerted by pistons 61 against the disk 62. With adjusting piston 72 and oblique disk 62 in the positions shown in FIG. 1, the pistons 61 are moved into the cylinders 59 as far as possible. With a retraction of piston 72, due to the escape of oil as described, the oblique disk 62 pivots or inclines about the projecting shoulder 69, whereby the pistons 61 are permitted to move out of their cylinders a greater or less extent depending upon the angular position of disk 62. The pistons 61 continuously exert a force on the oblique disk, which force is opposed to the force of the adjusting piston 72 and urges the oblique disk 62 toward the left. When the piston 72 is fully retracted, the inclination of the oblique disk is 15°, having executed a pivoting movement about the off-center shoulder 69. Thus, under the influence of the force exerted by the pistons 61, the oblique disk 62 follows the adjusting piston 72 on drainage of the oil and thereby moves in the guide surface 71 from vertical position to an inclination of 15°.

The right end of the control slide 86 in the left extreme position of the same is positioned before the control opening 89. Now, operating oil flows from the high pressure chamber of the transmission through channel 126, bore 123, holes 131 into the tubular control slide 86, out of the right end thereof into the opening 89 and through channel 91 into the adjusting cylinder chamber 92. Thus the piston 43 executes a stroke continuing to move out until the control opening 89 is closed by the enlarged end 88 of the control slide 86. This movement of the piston causes the oblique disk 28 to move to a vertical position from the fully inclined position. It pivots at the projecting shoulder 35 and slides in the guide surface 42. In the manner described in connection with the pump system of the transmission, a resetting force of the pistons 27 tends to counteract the force and movement of adjusting piston 43.

If, now, the control slide 86 is slowly moved to the right, initially nothing changes in the pump section at the left end of the slide. The enlarged end of slide 86 slides in the dead zone of bore 93 beyond the control opening 94 just as before. The oblique disk 62 remains in its position of maximum inclination. However, in the motor system at the right end of the transmission, the control opening 89 is uncovered. Thereupon oil flows from chamber 92 through channel 91, opening 89, passes behind the enlarged end 88 through bore 87 along the outside of slide 86 into the sump 110. Thus the piston 43 retracts until the opening 89 is again closed by the enlarged end 88. Thus piston 43 first follows the movement of the control slide 86, whereas piston 72 is not influenced by the initial movement thereof.

Under the influence of the resetting forces of the pistons 27, the oblique disk follows the adjusting piston and assumes an inclined position.

On further displacement of the control slide 86 to the right, the enlarged end 97 travels beyond the control opening 94. Now operating oil flows through tubular control slide 86, opening 94 and channel 95 into the cylinder chamber 96 so that the piston 72 starts its stroke until the control opening 94 is closed again. The right end of the control slide 86 moves in the dead zone of bore 87 so that the adjusting movement does not exercise an influence any more on piston 43. In contrast thereto, piston 72 now follows the adjusting movement of slide 86. The oblique disk 62 is moved into its described vertical position and on further movement of the control slide 86 even somewhat beyond this position, (as is indicated in FIG. 5). With an opposite movement of the control slide 86, the correspondingly reverse operation takes place.

It must be observed that the control slide 86 with each of the pistons 43 and 72 provides a follow piston system with dead stroke, the pick-up piston of which is provided by the control slide which simultaneously carries the pressure means. Such an alternating action of the control slide 86 on the piston 43 or on the piston 72 can in this manner, of course, only be realized with a unilaterally acting adjusting piston. Therefore a suitable resetting force had to be provided which the working pistons 27, 61 are supplying.

The cylinder block 58 is driven at the input speed $n_1$ of the shaft 6. The oblique disks 28 and 62 are connected to the driven shaft. In the extreme left position of the control slide 86, the oblique disks 62, 28 are in the position as is schematically indicated in FIG. 2. The right system operating as motor is in its zero position and is not in a position to receive any oil. The system at the left end of the transmission, operating as pump, is at maximum capacity. In this position driving shaft 6 and driven shaft 12 are rigidly coupled with each other through the working oil. The oblique disks and consequently the driven shaft are rotating with the input speed and there is no flow of working oil. Consequently, an $i=1:1$ transmission ratio (direct gear) and a purely mechanical power transmission are obtained.

In the position of the oblique disks according to FIG. 4, the left system does not pump any oil. The rotation of the driving shaft has no influence whatsoever on the oblique disks and on the driven shaft. Consequently $i=\infty:1$ and the engine is idling.

Between these two extremes, as indicated, for example, in FIG. 3, lie the various reductions. In the position according to FIG. 5 the pressure and the suction sides at the operating slide valves are exchanged and consequntly the driven shaft runs in opposite direction (reverse gear).

Quantitatively the following applies:

If $v_1$ is the volume of working oil capable of being pumped with a given setting of the oblique disk 62 per relative revolution of the cylinder block 58 and the oblique disk 62, and $v_2$ the volume which is received per revolution by the motor system 25, 28, then $$v_1(n_1-n_2)=v_2 n_2$$

or $$i=\frac{n_1}{n_2}=\left(1+\frac{v_2}{v_1}\right)$$

With the described transmission, through variation of $v_2$ (adjustment of piston 43 and oblique disk 28) the transmission ratio $i$ may be adjusted from $$i=\left(1+\frac{0}{1}\right)=1:1 \qquad \text{(FIG. 2)}$$

through $$i=\left(1+\frac{1}{1}\right)=2:1$$

and so on to $$i=\left(1+\frac{4}{1}\right)=5:1$$

A further increase of $v_2$ (secondary adjustment) would result in constructional difficulties. Therefore, the oblique disk 62 is now adjusted in the described manner and consequently $v_1$ continuously decreased, whereby high reductions up to idling may be adjusted (primary adjustment).

FIGS. 9 and 10 show a corresponding design for a transmission without power branching (where the input power may be purely mechanically transmitted to the driven shaft).

Reference numeral 135 designates a transmission casing wherein on one side the driving shaft 137 is supported in a bearing 136 and on the other side the driven shaft 139 in a bearing 138. On the driving shaft 137 an operating oil pump 141 is mounted which corresponds to the pump as shown in FIG. 6. The operating oil pump 141 draws in oil over a suction pipe 142 from a sump 143 and feeds the oil into an operating oil pipe 144.

The casing 135 is subdivided approximately in the middle by an operating slide valve 145 which is fixed to the casing by screws 146. A central shaft 147 is non-rotatably mounted in the operating slide valve 145. This shaft on the left side abuts the slide valve 145 with a shoulder 148 and has a longitudinal groove 149 (FIG. 10) into which a spline of the slide valve 145 protrudes so that the shaft 147 is non-rotatably positioned in the operating slide valve. On the ends of shaft 147 are positioned adjusting cylinder bodies 151 and 152, respectively (with adjusting pistons), and oblique disks or swash plate assemblies 153 and 154, respectively. These are of the same design as the corresponding parts of FIG. 1 and are therefore not described here in detail. Cylinder blocks 155, 156 abut the operating slide valve 145 on both sides and the pistons engage the oblique disks 153 and 154. These cylinder blocks are designed in substantially the same manner as are the cylinder blocks 25 and 58 of FIG. 1. Since, however, both cylinder blocks are rotating here, no provision is made in the cylinder block 156 for the extension therethrough of operating oil channel or adjusting means. In contrast to the embodiment according to FIG. 1, the operating slide valve 145 is stationary here. The cylinder blocks 155, 156 are coupled with the driving and the driven shaft 137, 139, respectively, through bell-shaped coupling parts 157 and 158, respectively. These enclose the control cylinders 151, 152 and the oblique disks 153, 154 mounted on the shaft 147 and are provided with internal toothings 159, 160 which are in clearance engagement with corresponding external toothings of the cylinder blocks 155, 156 and permit fitting of the cylinder blocks 155, 156 relatively to the faces of the operating slide valve 145.

Adjustment of the oblique disks 153, 154 takes place in a manner similar to that described with reference to the embodiment according to FIG. 1 by means of control slides which are movable in groove 149 of shaft 147. However, two tubular control slides 161, 162 are provided here which are individually and independently movable, slide 161 controlling the oblique disk 153 and slide 162 the oblique disk 154. The control slides 161 and 162 are in communication with the chamber of the operating slide valve 145 that serves as a high pressure working oil chamber, through a radial channel 163 and a T-channel 165 containing a slide valve 164 (FIGURE 10). In this respect the design is completely analogous to that according to FIGS. 1 and 7. In a completely analogous manner the supply of the operating oil takes place. Only, the operating oil is not supplied over the detour of the cylinder block as it was necessary with the design according to FIGS. 1, 7 and 8, but the operating oil pipe 144 is directly connected with a radial channel 166 of the stationary operating slide valve. This channel is in communication with the control chambers of the operating slide valve through check valves 167, 168 (FIG. 10).

The adjustment of the tubular slides 161 and 162 herein is also effected across the stationary operating slide valve 145. One slide is adjusted by means of a hollow shaft 169 (FIG. 10) to which a handle 171 is affixed at its external end and an external toothing 172 provided at the internal end. The toothing 172 is in engagement with a toothed rack 173 (FIGS. 9 and 10) which engages a stop 174 of slide 162. A second shaft 175 with a handle 176 and a toothed gear 177 extends through the hollow shaft 169. Gear 177 is in engagement with a second rack 178 parallel and arranged to reciprocate alongside to the first. Rack 178 engages a stop 179 of the control slide 161. The racks 173 and 178 are axially movably guided in a recess of the stationary shaft 147 and the shafts 169, 175 extend through a transverse bore in shaft 147, as can be seen in FIG. 10. By rotation of the handles 171, 176, the racks 173, 178 may be individually axially moved and therewith the control slides 161, 162. This permits an adjustment of the oblique disks 153 and 154 independently of each other.

With the transmission of FIGS. 9 and 10 no power branching takes place. System 153, 155 acts as a pump which is being driven by the shaft 137. The system 154, 156 acts as an oil motor which drives the shaft 139 and is supplied with working oil by the pump 153, 155. Thereby the transmission ratio is $$i=\frac{n_1}{n_2}=\frac{v_2}{v_1}$$

Reverting to the embodiment of FIG. 1, instead of across the stationary parts, i.e., cylinder block (FIG. 1) or operating slide valve (FIG. 9), the displacement of the control slide 86 may also be effected centrally through the driven shaft 12, as is indicated in FIG. 11 as a modification of FIG. 1. An adjusting rod 179 extending axially into the shaft engages the control slide 86 by means of a pin 181 protruding through a longitudinal slot 180 of shaft 12. The adjusting rod protrudes at the driven end of shaft 12 and has a ring defining a recess 182 into which an adjusting handle 183 is fitted.

Turning now to the embodiment of FIGS. 12–17, reference numeral 184 designates a core shaft extending through the hydrostatic transmission at its axis. On this shaft 184 at the left end of the transmission, a sleeve 185 having radial bores 186 is supported. The bores 186 open to the right, that is to say inwardly to the transmission, into an annular chamber 187 which surrounds the core shaft 184 and is defined by a ring 188 which is inserted into the sleeve 185. To the left, that is to say outwardly, a labyrinth packing 189 is provided. A hollow driven shaft 190 surrounds shaft 184 almost for the total length thereof, a small spacing between the two shafts providing an annular channel space around shaft 184, which space is in communication with the bores 185 through the annular chamber 187. As will be explained hereinafter, this annular channel 191 serves the central operating oil supply. The operating oil is supplied by a pump 216 to be described hereinafter and forced inwardly into the annular channel 191 through the bores 186, and can be tapped in a manner to be described hereinafter at suitable points.

An adjusting cylinder 192 is keyed with the driven shaft 190. This cylinder is secured by rings 193, 194 against axial displacement. An adjusting piston 195 is disposed within in the cylinder and is axially movably guided on the driven shaft 190. The piston 195 has a collar 196 with an axial external groove 197 (see also FIG. 15). The collar 196 tightly encloses and rotates with the driven shaft 190. On the collar 196 a toroidal ring 198 with spherical surface is axially movably guided. On the toroidal ring 198 an oblique disk 199 with correspondingly spherical inner surface is supported. This oblique disk 199 comprises a hub portion 200 of cylindrical basic shape with said spherical inner surface, a base ring 201, which is supported on a radial flange 202 of the hub portion 200 and a race 203 which is supported on the base ring 201 by a thrust bearing 204 with three sets of rollers. The whole is held together by a shell 205 with flanged edges. The hub portion 200 has axial grooves opposite each other of the width of the toroidal ring 198. These make it possible for the toroidal ring 198 to be moved with its center plane perpendicular relatively to that of the hub portion 200 into the same until the centers of the spherical surface, and inner surface respectively, coincide. Then, parts 198, 200 may be rotated in opposition to each other as desired and ring 198 is secured in the portion 200.

The adjusting cylinder 192 has two co-axial but off-center bearing boxes 206 (FIG. 15). On the opposite side of the central axis of the transmission, the adjusting piston 195 has two co-axial bearing boxes 207. The axes of the bearing boxes 206 and 207 are parallel relatively to each other. Two semi-cylindrical bolts 208 and 209, respectively, are supported in the bearing boxes 206 and 207. The shape of these bolts may best be recognized in FIG. 15. They show central recesses which are provided to accommodate the collar 196. The bolt 208 engages into the groove 197 of collar 196 with a spline 210. The oblique disk 199 is supported on the plane surfaces of the bolts 208 and 209.

The oblique disk non-positively abuts the bolts 208 and 209 in a manner to be described hereinafter. With movement of the adjusting piston 195 the bolt 208 is unmoved while the bolt 209 moves with the movement of the adjusting piston 195. Thus, the oblique disk 199 is inclinationally moved in counter-clockwise direction in FIG. 12 with outward stroke of the piston, the bolts 208 and 209 rotating accordingly in their bearing boxes 206, 207 so that they constantly abut the oblique disk 199 with their plane surfaces. Thus, the oblique disk 199 inclines about its center of gravity which remains on the rotational axis of the transmission. This inclinational movement is super-imposed by an axial translation movement. This is taken into account in that the toroidal ring 198 is movable in axial direction on sleeve 196.

The shaft 184 is supported in the hollow driving shaft 212 by means of the sleeve 185 and the adjusting cylinder 192 and a needle bearing 211, said driving shaft being supported in a casing 214 by means of a ball bearing 213. The driving shaft 212 provides an eccentric 215 for the pump 216 which will be described hereinafter. Then, the driving shaft 212 provides a bell-shaped casing 217 which encloses the adjusting cylinder 192 and the oblique disk 199 and by means of a toothing 218 engages a gear rim 219 on the periphery of a cylinder block 220. In the cylinder block 220 a ring of spaced axial pistons 222 are guided in cylinders 223 around the driven shaft 190 on which the cylinder block 220 is rotatably supported by means of a needle bearing 221, the pistons engaging the oblique disk 199. The cylinders 223 are in connection with the face 225 of an operating slide valve 226 through axial channels 224, said valve rotating with the driven shaft 190, the cylinder block abutting the face of the valve.

The pump 216 is a cycloidal pump. On the eccentric 215 a second eccentric 227 is supported. Both eccentrics 215 and 227 provide an eccentric guide path with easily variable eccentricity. On the eccentric 227 a cycloidal ring 228 with an external toothing is supported which in the known manner rolls within a stationary internally toothed cycloidal ring 229, this stationary ring having one tooth more than the rotating ring with external toothing. The two eccentrics allow for a minor variation of the eccentricity, making possible the alignment of the inner ring 228 relatively to the outer ring 229. The eccentric 227 has controlling slide valve 230 with radial bores 231 and the inner ring 228 as well as the eccentric 215 are provided with radial bores 232 and 233.

For the purposes of description of the present invention it will be sufficient to know that the pump 216 sucks in oil from the sump through connection 234 and chamber 235 through not distinguishable lateral openings of the eccentric 227 and feeds it inwardly where it flows into the annular channel 191 through channels 186.

Figure 17:
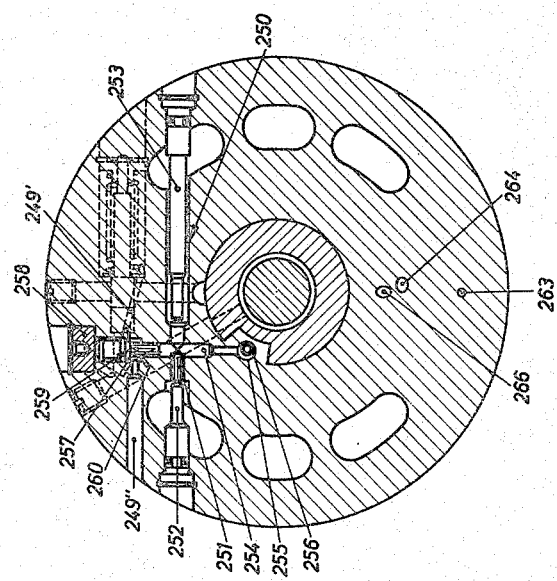
FIGS. 16 and 17 are cross-sectional views in different planes through the operating slide valve in the transmission of FIG. 12.
Figure 16:
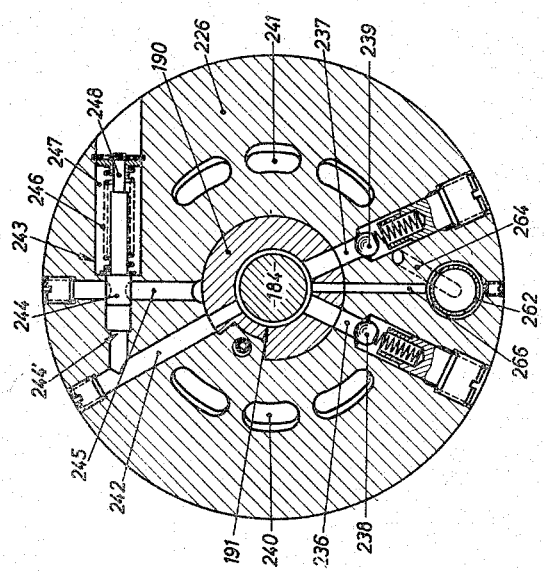

FIGURES 16 and 17 show the further distribution of the operating oil. In the operating slide valve 226 the oil flows from the annular channel 191 through radial channels 236 and 237 and check valves 238 and 239, respectively, to the suction side and the pressure side, respectively, of the controlling slide valve. Through a further radial channel 242 oil is furthermore fed from the annular channel 191 to a pressure-regulating valve 243. The pressure-regulating valve has a piston 244 controlling an outlet channel 245. The operating oil pressure in the system acts on the piston 244 on the one side, a spring 246 being arranged on the other side in a chamber 247 which normally is in communication with the outlet through channels 249' and 249'' (FIG. 17). The piston 244 is designed as a differential piston and with a central portion 248 is sealingly guided in chamber 247. The pressure in chamber 247 therefore only acts on one annular surface around the central extended portion 248 while the atmospheric pressure does act on the front surface of portion 248. As long as chamber 247 is under atmospheric pressure, the design of the piston as a differential piston has no particular effect. The pressure is adjusted in the system so that the force acting on the entire front surface 244' of the piston 244, just counterbalances the spring tension. If the pressure increases, the piston further opens the channel 245, and, if the pressure is reduced, the outlet is more considerably throttled.

In FIG. 17 it is shown that in a transverse bore 250 which at one end is in communication with the pressure side of the operating slide valve and on the other in communication with the suction side of the operating slide valve, a slide piston 251 is arranged to slide between two stops 252 and 253. Between these stops 252 and 253, channel 250 is traversed by a channel 254. If the operating slide valve carries the working pressure on the right side in FIG. 17 and suction on the left, then piston 251 is moved to the left side position as illustrated, by the working pressure so that channel 254 is connected with the right side of the operating slide valve that carries the working oil pressure. If the sides of the controlling slide valve exchange their function—which is possible—and the pressure side is on the left and the suction side on the right, then the piston 251 is moved to the right by the pressure so that the left side of the operating slide valve and of channel 250 is connected with channel 254. Channel 254 therefore in any event carries the working pressure. Channel 254 opens into a longitudinal channel 255 wherein a tubular control slide 256 for controlling the oblique disks is movable and through which the pressure oil is fed into the adjusting cylinder.

The working pressure is also effective in channel 254 below a piston 257. This piston 257 is designed as a differential piston. The operating oil pressure acts on a greater area 258, while an annular area 259 resulting from the step is exposed to atmospheric pressure. The piston controls channel 249'. In the illustrated upper end position, channel 249' is in communication with the atmosphere through the annular chamber 260 and channel 249''. This is the normal condition, where a high working pressure is existing and the piston 257 is therefore pressed upwardly by the working pressure against the action of the operating oil pressure. The regulating valve 243 adjusts a relatively low operating oil pressure. This operating oil pressure exists on the suction side of the operating slide valve, whereas the working pressure is raised above the operating oil pressure in accordance with the transmitted torque. The operating oil pressure counteracts the working pressure with respect to the development of the torque. If, now, the working pressure decreases below a certain minimum value due to a decrease of the transmitted torque, then the operating oil pressure, since it acts on a greater area 258 of piston 257, can overcome the working pressure and move the piston 257 into its lower end position (FIG. 17). In this position of the piston 257, chamber 247 is connected with the operating oil pressure through channel 249'. Then, the operating oil pressure also acts on the annular surface of piston 244 around the center portion 248. The force exerted on this area in the direction of the spring tension therefore compensates the force which is exerted in opposition to the spring tension on the corresponding surface portion of surface 244'. The active surface for the force exerted by the operating oil pressure and counteracting the spring 246 therefore only still corresponds to the front surface of the piston center portion 248. Therefore, a correspondingly higher pressure must be adjusted so that the force caused by the operating oil pressure counterbalances the spring tension, since the operating oil pressure acts on a smaller area. Thus, the operating oil pressure increases. In the same degree, the working pressure increases, since, for example, with a transmission the differential of working pressure and operating oil pressure is determined by the transmitted torque and remains constant as long as the torque does not change. The increase of the operating oil pressure and consequently of the working pressure results in the fact that also with minor transmitted torques a sufficient pressure is maintained in the system and a satisfactory non-positive connection is guaranteed always to the axial pistons. In particular, it is assumed that because of the force exerted by the pistons, the oblique disk cannot straighten out under the influence of centrifugal force.

If the transmitted torque increases again, then the working pressure correspondingly rises above the operating oil pressure. Then a moment occurs where the working pressure again overcomes the operating oil pressure at the piston 257. At that moment chamber 247 is again connected with the outlet. The regulating valve 243 again adjusts the normal low operating oil pressure and working pressure and operating oil pressure together decrease accordingly.

A pressure chamber 261 (FIG. 15) is defined by grooves on the face 225 of slide valve 226. Within the pressure chamber 261 a pressure-reducing piston 262 is arranged with which a high-pressure piston 263 abuts, piston 263 being in connection with the high-pressure— or working pressure—chamber on the other side through a connection 264. Piston 263 presses the pressure-reducing piston 262 to the left whereby the latter opens a connection of the pressure chamber 261 and of chamber 267 with the operating oil chamber through connection 266 through control openings 265. If the pressure in the pressure chamber 261, which acts on the large area of piston 262, overcomes the high pressure which only acts on the small area of the high-pressure piston 263, then connection 266 is throttled and an outlet 268 of the pressure chamber 267 is released. Thus, the pressure chamber 261 is subject to a pressure which is always proportional to the working or high pressure of connection 264, but substantially lower than the latter.

The pressure chamber 261 exerts a force on the cylinder block 220, which counteracts the centrifugal force momentum and consequently hydraulically receives the bearing pressure occurring through the load of the centrifugal forces.

FIG. 18 presents a modification of the embodiment in FIGS. 12 to 15. Herein the collar 271 of the adjusting piston is provided with a spherical torus 272 which is integral or affixed to collar 271. On this torus 272 the oblique disk 273 is supported with a cylindrical inner surface. This support permits at the same time an inclinational movement of the oblique disk 273 and an axial movement, the latter being effected through displacement of the cylinder 274 on the torus 272. With this design the center of gravity of the oblique disk may travel on curve 275. It can be seen that here, too, the center of gravity always practically remains on the rotational axis of the transmission.

The design according to the invention as described with reference to FIGS. 12–18 is, of course, not limited to power-branched transmissions of the type herein described, but is also applicable to transmissions which are not power-branched.

Figure 12:
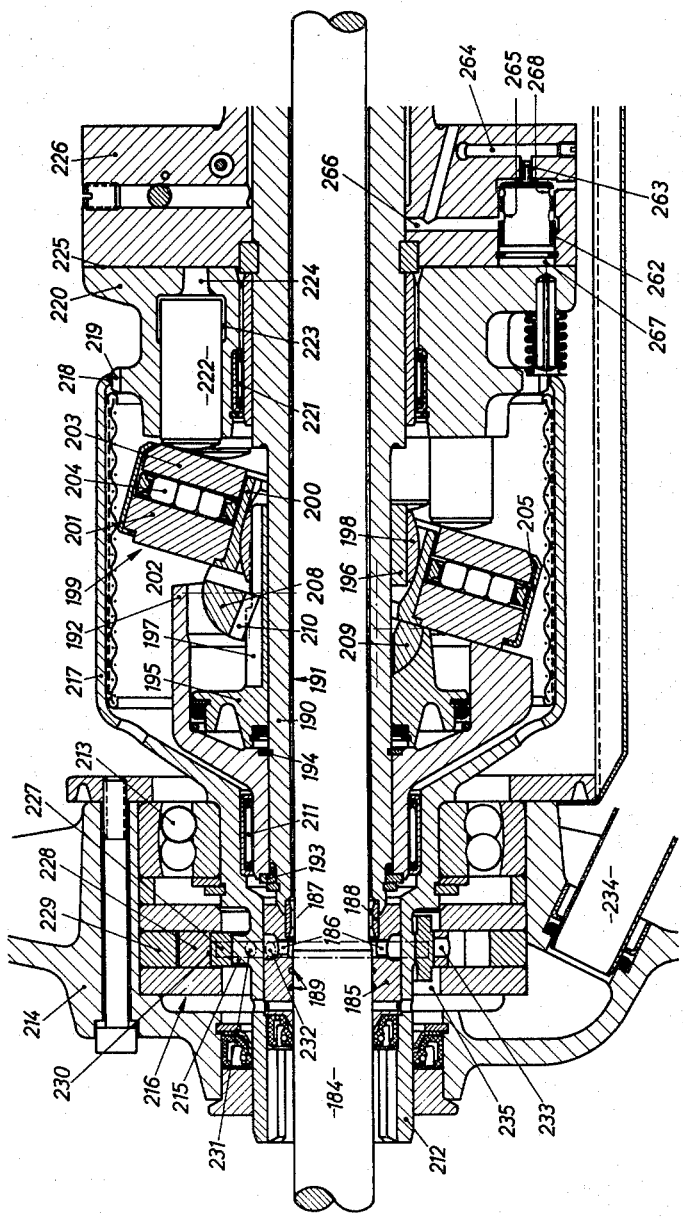
FIG. 12 is a longitudinal section showing the driving side of another form of hydrostatic axial piston transmission embodying the invention.

In the transmission of FIG. 12, the cylinder block 220 is driven by the driving shaft. The shaft 184 with the sleeve 185 and hollow driven shaft 190 and the oblique disk 199 with the adjusting gear 192, 195 as well as the controlling slide valve part 226 rotate with the output speed. The same applies for the oblique disk with adjusting gear connected to the output or motor side (not shown), while the cylinder block connected to the output side is stationarily arranged with respect to the casing. Thus, a power-branched transmission is dealt with here being of the same basic design as is provided with the transmission according to FIG. 1.

FIG. 19 presents another form of power-branched transmission. Reference numeral 301 designates a hollow driving shaft which has a bell-shaped extension and provides a hollow cylinder 302 which surrounds the oblique disk system 303 and which drives the cylinder block 305 with toothing 304.

The hollow driven shaft 308 encloses a core shaft 307 which extends through the whole transmission, the hollow shaft surrounding the core shaft with a small spacing therefrom to form an annular channel 309 extending along the length of shaft 308. The oblique disk system or swash plate assembly 303 is connected with the driving shaft. An operating slide valve 310 and the oblique disk system or swash plate assembly 311 is connected with the driven shaft 308. The cylinder block 312, associated with the output of the transmission, is stationarily arranged in the casing 314 by means of a hollow cylinder 313. The operation of this transmission substantially corresponds to that of the transmission according to FIG. 1.

Shaft 308 is supported with the oblique disk system 303 in the bell-shaped extension of the driving shaft 301 by means of a needle bearing 315. Shaft 301 on its part is supported in casing 314 by means of a ball bearing 316. On the other side, shaft 308 with the oblique disk system 311 is supported in casing 314 by means of a ball bearing 317.

Figure 20:
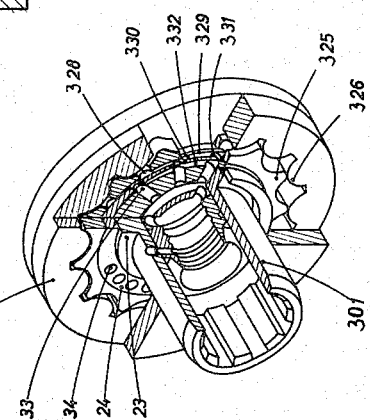
FIG 20 is a perspective view, partly in cross section of the operating oil pump of the transmission of FIG. 19, and FIGS. 21 and 22 are detail views, in cross section of the operating slide valve of the transmission of FIG. 19.

An operating oil pump 318 is arranged on the driving shaft 301, which is designed as novel cycloidal pump, as illustrated in FIG. 20. The driving shaft 301 turns in a ring 319 having an annular extension 320 and radial bores 321. Bores 321 are inwardly connected with annular channel 309, while the ring 319 provides for a sealing of channel 309 and bores 321 through a labyrinth packing. The driving shaft 301 provides an eccentric 323 (FIG. 20). On the eccentric 323 an eccentric hoop 324 is arranged the periphery of which is eccentrically arranged relatively to that of the eccentric 323. From this double eccentric 323, 324, however, a resulting eccentricity follows relative to the axis of shaft 301. On the eccentric hoop 324 a gear 325 is supported which with suitably curve-shaped teeth rolls in a corresponding internal toothing 326 of a ring 327 which is stationary with respect to the casing and centric relatively to the shaft 301. Thereby the chambers between the teeth of gear 325 and ring 327 are successively enlarged and diminished again, if the eccentric 323 and the eccentric hoop 324 are rotated with the driving shaft 301. On the one side the teeth are engaging relatively to each other and on the opposite side they are crest to crest. The internal toothing 326 has one tooth more than the gear 325.

Gear 325 has radial bores between all teeth. These open into an operating slide valve 329 at the periphery of the eccentric hoop 324. The shell of this hoop 324 has two half-moon shaped recesses 330, one of which can be seen in FIG. 20 and provides the pressure side of the operating slide valve 329. This is connected through radial bores 331 with a half-moon shaped recess 332 of the eccentric 323. Channels 333 of the eccentric 323 open into the annular chamber 320. The recess connected to the suction side of the eccentric hoop 324 is in connection with an annular chamber 335 (FIG. 19) through axial bores 334, from where a pipe 336 leads into the sump.

Figure 22:
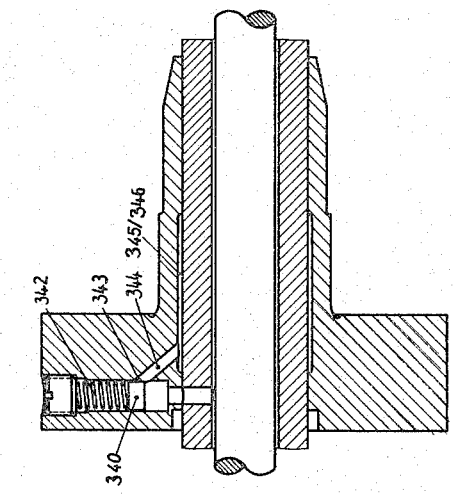
Figure 21:
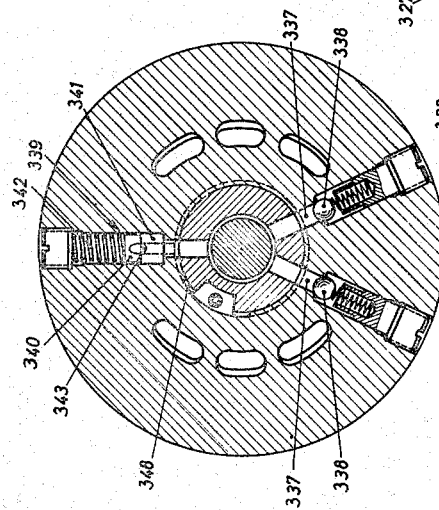

The pump sucks in oil from the sump and feeds it inwardly through the openings 328, 331, 321 into channel 309. From there it is fed through radial bores 337 in the usual manner through check valves 338 into the system of the axial pistons. The pressure of the operating oil is kept constant by means of a pressure-regulating valve 339 (FIG. 21). This pressure-regulating valve has a piston 340 sliding in a bore 341. A spring 342 acts on the piston 340 on one side, the operating oil pressure on the other side. Piston 340 controls an outlet channel 343, 344 (FIG. 22). The outlet channel is throttled in the usual manner so that the operating oil pressure is just counterbalanced by the spring tension.

The oil flowing off through outlet 343, 344 of the pressure-regulating valve 339 travels into an axial channel 345, the annular chamber 346 and an axial groove 347 in shaft 308. Simultaneously it is fed through a groove 348 of the operating slide valve 310 into a groove 349 of shaft 308, providing an extension of grooves 347, but being separated therefrom. The oil flows off axially in the grooves and is then sprayed, as illustrated, against the oblique disks 303, 311 under the influence of centrifugal force, said disks being cooled thereby.

The oil centrifuged from the oblique disk 303 is thrown against the inside wall of cylinder 302 which is covered with a pilot-cloth ("Molton"-cloth) 350. The cloth 350 is kept in place by a wire net 351. The dirt particles contained in the oil are caught in the cloth so that a continuous cleaning of the oil is being effected and with low oil consumption the life of the transmission is substantially prolonged. The oil flows through opening 352 back into the sump through tray 353 and is cooled during this passage. The pilot-cloth may easily be changed from time to time.

A tubular control slide 354 slides in the grooves 347, 349 of the shaft 308. This slide serves for adjusting the oblique disks in manner as above described. The control slide 354 is connected with an adjusting ring 355 which is axially movably arranged exteriorly on the driven shaft and may be axially displaced to adjust slide 354 by means of an annular groove 356 through adequate means engaging therein.

Invention is claimed as follows:

1. In a hydraulic axial piston machine including shaft means at least a portion of which is rotational and defines a rotational axis, a cylinder block device having a plurality of pistons mounted in cylinders therein, positioned about said axis and movable parallel to said axis, and a swash plate device, with one of said devices being connected to said rotational portion of said shaft means for rotation therewith, the improvement comprising: said swash plate device being positioned about said axis and pivotal with respect to said rotational axis about a pivotal axis transverse to the rotational axis and spaced to one side of the rotational axis, said swash plate device having a pressure means operatively engaging said pistons whereby the pistons urge the swash plate device in one direction of movement about said pivotal axis; inclination adjusting means including a single acting fluid operated linear motor means having a movable part operatively engaging the swash plate device and movable parallel to the rotational axis to urge the swash plate device in the opposite of said one direction about said pivotal axis when fluid under pressure is supplied to said motor means; and fluid control means connected to said motor means to adjustably position the position of the movable part and thereby set the position of the swash plate device about said pivotal axis and thus the inclination of the pressure means with respect to the rotational axis.

2. In a machine as set forth in claim 1, wherein said swash plate device has a convex cylindrical guide surface on the side thereof opposite said pressure means, and said movable part has a mating concave cylindrical guide surface abutting the guide surface of the swash plate device.

3. In a machine as set forth in claim 1, wherein said motor means includes an adjusting cylinder member and an adjusting piston member therein, one of said members being movable parallel to said rotational axis and being said movable part; said control means includes a hollow slide movable parallel to the rotational axis to control the flow of fluid for the adjusting cylinder, and means operatively connected to said side and externally operable to adjust the axial position of the side and thus the flow of fluid for the adjusting cylinder.

4. In a machine as set forth in claim 3, wherein said movable part includes a closed bore defining a control cylinder aligned with the slide, and also includes a passageway communicating with said bore at a point spaced from the closed end thereof and communicating with the adjusting cylinder, and said slide includes an enlarged head on the end adjacent said bore, said head being of a size to serve as a piston in said control cylinder and of an axial length to close the bore end of the passageway.

5. In a machine as set forth in claim 4 and including a pump to supply high pressure operating oil, and wherein said control means is adapted to supply the high pressure operating oil to the slide.

6. In a machine as set forth in claim 1 and including a central guide member coaxial with said rotational axis, and wherein said motor means includes a fixed adjusting cylinder concentric with said rotational axis and an adjusting piston movable therein, said adjusting piston being said movable part; said swash plate device is supported on the central guide member for inclinable and axial movement with respect thereto; and said inclination adjusting means includes two supporting members, parallel to each other, transverse to the rotational axis and at opposite sides of the guide member respectively, one of said supporting members being mounted on the adjusting cylinder and the other of the adjusting members being mounted on the adjusting piston.

7. In a machine as set forth in claim 6, wherein said supporting members are semicylindrical bolts having a plane surface, said supporting members being rotatably mounted in the cylinder and piston respectively with the plane surfaces facing and abutting the swash plate device.

8. In a machine as set forth in claim 6, wherein said guide member has a toroidal ring mounted thereon for axial movement along said rotational axis, said ring having a semi-spherical external surface, said swash plate means having an inner semispherical surface about and in contact with the surface of the ring.

9. In a machine as set forth in claim 6, wherein said guide member has a toroidal ring mounted thereon for axial movement along said rotational axis, said ring having a semi-spherical external surface, said swash plate means having an inner semicylindrical surface about and in contact with the surface of the ring.

10. In a machine as set forth in claim 6, including a chamber communicating with one group of the cylinders of the cylinder block device and the working pressure in said chamber is a function of the force being transmitted between the devices; and including a pump to supply high pressure operating oil to the cylinders of the cylinder block device, regulating means communicating with the pump discharge to control the operating oil pressure, said regulating means being operatively connected to said chamber to increase the operating oil pressure in response to a decrease in working oil pressure and to decrease the operating oil pressure in response to an increase in working oil pressure.

11. In a machine as set forth in claim 10, wherein the regulating means comprises a resiliently suspended to differential regulating piston which on one side is subject to the pump pressure and is opposed by a spring and controls the outlet for the operating oil, and with a decrease of the working pressure operating oil pressure is applied to bear on the spring side on an area less than that of the one side so as to counter-balance a portion only of the force applied to said one side.

12. In a machine as set forth in claim 11, and including a reversing means with a differential reversing piston movable between two extreme positions and acted on in one direction by the working pressure and acted upon in the other direction and over a larger area by the operating oil pressure, said reversing means being connected to the regulating means and to an outlet to provide a connection through which the spring side of the regulating piston is fully exposed to the outlet pressure where in the normal operation of the machine the working pressure overcomes the operating oil pressure and maintains the reversing piston in one extreme position, and to supply the operating oil pressure past the reversing piston to said area on the spring side of the regulating piston when the working pressure decreases and the reversing piston moves into the other extreme position.

13. In a machine as set forth in claim 1, wherein said cylinder block device has a plane face positioned normal to the rotational axis and at the opposite side thereof from said cylinders, and ports in said face communicating with said cylinders; and including a slide valve plate having a plane face abutting said plane face of the cylinder block device and having ports therein for fluid communication with said cylinders, said face of said slide valve plate having a pressure chamber in said face larger than the ports in the cylinder block device, which chamber is subject to a pressure proportional to the working pressure and constitutes a momentum with the residual force of the axial relief counteracting the centrifugal force momentum of the pistons.

14. In a machine as set forth in claim 1, wherein said shaft means includes a core shaft and a hollow shaft surrounding the core shaft with a space between the two shafts, said machine including an operating oil pump delivering oil under pressure to said space, and a slide valve surrounding said shafts and communicating with said space to receive oil therefrom.

15. In a machine as set forth in claim 14, wherein said hollow shaft is the driven shaft and one of said devices is connected thereto, said pump surrounds said core shaft, and said shaft means includes a driving shaft connected to said pump to operate the same and to the other device to rotate the same.

16. In a machine as set forth in claim 1, and including: a pump to supply with pressure operating oil; an oil line communicating between said pump and the cylinders of the cylinder block device; and means connected to said line to regulate the pressure at which the oil is supplied to the cylinders, said regulating means including a pressure relief valve and a relief discharge passage extending therefrom with a portion being in an axial channel in the shaft means, said passage having an outlet adjacent said swash plate device to spray the discharged oil by centrifugal force over the swash plate device.

17. In a machine as set forth in claim 16, and including a hollow cylinder about the swash plate means, said cylinder having an inner surface covered with a cloth to catch and hold foreign particles in the oil.

18. In a machine as set forth in claim 3, wherein said shaft means includes a rotatable shaft with a longitudinal opening therein and a groove extending longitudinally along the side thereof, said slide being positioned in said groove, said means to adjacent the position of the slide including an adjusting ring coaxial with the shaft at one end of the machine and movable axially with respect to the shaft, and means in the longitudinal opening in the shaft and connecting the ring and slide, whereby the slide may be moved by moving the ring.

19. In a machine as set forth in claim 3, wherein said shaft means includes a shaft with a groove extending longitudinally along a side thereof, said machine including a stationary part about said shaft, said slide being positioned in said groove, said means to adjust the position of the slide including shaft means extending through said stationary part and rotatable with respect thereto, and means operatively connecting the inner end of the shaft with said slide.

20. In a machine as set forth in claim 19, wherein said cylinder block device is the stationary part and the shaft of the shaft means is a rotatable shaft.

21. In a machine as set forth in claim 19, wherein said stationary part is a slide valve plate said shaft of the shaft means is a fixed shaft mounted on said plate.

22. A power transmission comprising in combination: a frame; rotatable shaft means defining a rotational axis and including a driving shaft and a driven shaft; a slide plate valve device positioned about said shaft and having two contact faces normal to said axis; a first cylinder block device positioned about said axis and having a contact face on one side, cylinders in the other side and pistons in said cylinders, said contact face of the cylinder block device being in contact with one of the contact faces of the plate valve device; a first swash plate device positioned about said axis and pivotal with respect to said rotational axis about a pivotal axis transverse to the rotational axis and spaced to one side of the rotational axis, said swash plate device having a pressure means operatively engaging said pistons whereby the pistons urge the swash plate device in one direction of movement about said pivotal axis; first inclination adjusting means including a single acting fluid operated linear motor means having a movable part operatively engaging the swash plate device and movable parallel to the rotational axis to urge the swash plate device in the opposite of said one direction about said pivotal axis when fluid under pressure is supplied to said motor means; a second cylinder block device positioned about said axis and having a contact face on one side, cylinders in the other side and pistons in said cylinders, said contact face of the second block device being in contact with the other of the contact faces of the plate valve device; a second swash plate device positioned about said axis and pivotal with respect to said rotational axis about a pivotal axis transverse to the rotational axis and spaced to one side of the rotational axis, said second swash plate device having a pressure means operatively engaging the pistons of the second block device whereby the pistons urge the second swash plate device in a first direction of movement about its pivotal axis; second inclination adusting means including a second single acting fluid operated linear motor means having a movable part operatively engaging the second swash plate device and movable parallel to the rotational axis to urge the second swash plate device in the opposite of said first direction about said pivotal axis when pressure is applied to the second motor means; one of said first devices being connected to the driving shaft; one of the second devices being connected to the driven shaft; said devices, said shaft means and said frame being so interconnected that there is relative rotation between the valve plate device and the two cylinder block devices; and fluid control means connected to the two motor means to adjustably position the position of the respective movable parts thereof and thereby set the position of the respective swash plate device about their pivotal axes and thus the inclination of the respective pressure means with respect to the rotational axis.

23. A transmission as set forth in claim 22, including positioning means connected to the first cylinder block device and positioning means connected to the second cylinder block device to control the relative rotational positions of the block devices.

24. A transmission as set forth in claim 23, wherein each positioning means includes a housing engaging the respective cylinder block device loosely with clearance to permit the contact faces of the cylinder block devices to align with the respective faces of the slide plate valve device.

25. A transmission as set forth in claim 23, wherein the positioning means of the first cylinder block device also is connected to the driving shaft for rotation therewith, and the positioning means of the second cylinder block device also is connected to the frame to hold the latter stationary, said swash plate devices and said slide plate valve device being connected to the driven shaft for rotation therewith.

26. A transmission as set forth in claim 25, wherein said driven shaft has a longitudinal groove along one side thereof and extending between the two inclination adjusting means, said control means includes a hollow slide means positioned in said groove and movable longitudinally therein, means to supply fluid under pressure to said slide, passage means at each end of the slide means communicating with the respective motor means, said slide means acting to control the flow of fluid to the motor means depending upon the relative position of the slide with respect thereto, and means operatively connected to said slide means and externally operable to adjust the axial position of the slide means and thus the flow of fluid for the motor means.

27. A transmission as set forth in claim 26, wherein said means operatively connected to said slide includes a shaft extending through and journaled in the second cylinder block device, the two swash plate devices and the slide plate valve device have keys extending into said groove, said second cylinder block device has an operating oil channel extending radially therethrough, and said transmission includes an oil pump connected to deliver oil to said channel.

28. A transmission as set forth in claim 26, wherein each of said motor means includes an adjusting cylinder longitudinally fixed with respect to said shaft means and an adjusting piston in said cylinder, said adjusting pistons being movable axially of said shaft means and being said movable parts, each adjusting piston including a closed bore defining a control cylinder aligned with the slide, each also including a passageway communicating with said bore at a point spaced from the closed end thereof and communicating with the respective adjusting cylinder, and said slide means includes an enlarged head on the ends thereof adjacent said bores, said heads being of a size to serve as a piston in said control cylinders and of an axial length to close the bore ends of the passageways.

29. A transmission as set forth in claim 23, wherein the positioning means of the first cylinder block device is connected to the driving shaft, the positioning means of the second cylinder block device is connected to the driven shaft, the slide plate valve device is attached to said frame, said shaft means includes a dead shaft secured to the slide plate valve device, said cylinder block devices are journaled on said dead shaft, and said inclination adjusting means are connected to said dead shaft.

30. A transmission as set forth in claim 29 and including an oil pump to supply operating oil, and wherein said slide plate valve device has a radial conduit communicating with said pump to receive the operating oil, said dead shaft has a longitudinal groove along one side thereof and extending between the two inclination adjusting means, said control means includes slide means positioned in said groove and movable longitudinally therein, said slide plate valve device has means communicating with said conduit and with said slide means to supply oil to the slide means, said control means has passage means at each end of the slide means communicating with the respective motor means, said slide means acting to control the flow of fluid to the motor means depending upon the relative position of the slide means with respect thereto, and means operatively connected to said slide means and externally operable to adjust the axial position of the slide means and thus the flow of fluid for the motor means.

31. A power transmission comprising in combination: a frame; pump means to supply operating oil; rotatable shaft means defining a rotational axis and having a longitudinal groove therein; a slide plate valve device positioned about said shaft and having a contact face normal to said axis; cylinder block device positioned about said axis and having a contact face on one side, cylinders in the other side and pistons in said cylinders, said contact face of the block device being in contact with the contact face of the plate valve device; a swash plate device positioned about said axis and pivotal with respect to said rotational axis about a pivotal axis transverse to the rotational axis, said swash plate device having pressure means operatively engaging said pistons; inclination adjusting means operatively engaging the swash plate device to control the inclination of said pressure means, said adjusting means including a single acting cylinder member and a piston member concentric with said axis, one of said members being axially movable and the other of said members being restrained against axial movement, said movable member being operatively connected to said swash plate device; and control means communicating with said adjusting cylinder to adjustably position the position of the movable member and thereby set the inclination of the pressure means of the swash plate device, said control means including a hollow slide in said groove, said slide communicating with said pump means and being movable longitudinally to control the flow of oil therethrough to said adjusting cylinder, and means to control the position of the slide to control the position of the movable member.

References Cited in the file of this patent
UNITED STATES PATENTS

| | | |
|---|---|---|
| 2,382,027 | Rose | Aug. 14, 1945 |
| 2,453,128 | Hautzenroeder | Nov. 9, 1948 |
| 2,619,041 | Born | Nov. 25, 1952 |

UNITED STATES PATENT OFFICE
CERTIFICATE OF CORRECTION

Patent No. 3,175,363                         March 30, 1965

Hans Molly

It is hereby certified that error appears in the above numbered patent requiring correction and that the said Letters Patent should read as corrected below.

Column 1, line 46, for "aixal" read -- axial --; line 59, for "repect" read -- respect --; line 69, for "approches" read -- approaches --; line 71, for "forces" read -- force --; column 6, line 46, after "section" insert a comma; column 8, line 54, for "in" read -- as --; column 9, line 10, for "postons" read -- pistons --; column 13, line 25, for "185" read -- 186 --; column 14, lines 7 and 8, for "super-imposed" read -- superimposed --; column 17, line 73, for "grooves" read -- groove --; column 20, line 45, for "adjacent" read -- adjust --.

Signed and sealed this 28th day of September 1965.

(SEAL)
Attest:

ERNEST W. SWIDER                            EDWARD J. BRENNER
Attesting Officer                              Commissioner of Patents